United States Patent [19]

Temple

[11] 4,394,418

[45] Jul. 19, 1983

[54] AQUEOUS SIZING COMPOSITION AND GLASS FIBERS MADE THEREWITH FOR REINFORCING THERMOSETTING POLYMERS

[75] Inventor: Chester S. Temple, McKees Rocks, Pa.

[73] Assignee: PPG Industries, Inc., Pittsburgh, Pa.

[21] Appl. No.: 334,349

[22] Filed: Dec. 24, 1981

[51] Int. Cl.$^3$ ............................................... B32B 9/00
[52] U.S. Cl. ................................... 428/391; 523/404; 523/414; 523/421; 523/427; 523/437; 523/438; 523/443; 523/466; 523/467; 524/188; 524/230; 524/315; 524/322; 524/366; 524/375; 524/487; 524/488
[58] Field of Search ................ 428/392, 391; 523/404, 523/414, 421, 427, 437, 438, 443, 466, 467; 524/188, 230, 322, 315, 366, 375, 487, 488

[56] References Cited

U.S. PATENT DOCUMENTS

| | | | |
|---|---|---|---|
| 3,556,754 | 1/1971 | Marsden et al. ............................. | 65/3 |
| 3,655,353 | 4/1972 | Nalley et al. ............................... | 65/3 |
| 3,814,715 | 6/1974 | Nalley et al. ............... | 260/29.6 XA |
| 3,817,898 | 6/1974 | Ward .......................... | 260/29.6 NR |
| 3,882,068 | 5/1975 | Swartz ................................ | 260/29.6 |
| 3,935,344 | 1/1976 | Haggerty et al. ................... | 428/378 |
| 3,936,415 | 2/1976 | Coakley ............................ | 260/42.14 |
| 3,946,132 | 3/1976 | Hedden ................................ | 428/378 |
| 4,143,006 | 3/1979 | Workman .................... | 260/17.4 ST |
| 4,240,944 | 12/1980 | Temple ....................... | 260/29.6 NR |

FOREIGN PATENT DOCUMENTS

50-48233 6/1975 Japan .
1590409 10/1977 United Kingdom .

*Primary Examiner*—Melvyn I. Marquis
*Attorney, Agent, or Firm*—Kenneth J. Stachel

[57] ABSTRACT

An aqueous sizing composition for glass fibers and the resultant sized glass fiber strands are provided, where the sized glass fiber strands have an improved slip/flow property and resultant thermosetting articles reinforced with the sized glass fiber strands have improved impact properties. The aqueous sizing composition has a poly(vinyl acetate) silane copolymer, epoxy polymer, one or more lubricants, an organo silane coupling agent, which may be an amino-silane coupling agent, lubricant modified-amino-organo silane coupling agent, epoxy-containing silane coupling agent or a mixture of one or more of these coupling agents, one or more nonionic surfactants, a polyethylene-containing polymer, a wax, a hydrocarbon acid and water. The aqueous sizing composition is applied to glass fibers which are then produced into wet chopped glass fiber strands or continuous sized glass fiber strands. The continuous sized glass fiber strands may be subsequently dried under drying conditions sufficient to remove a substantial amount of the moisture of the strands for subsequent chopping to produce dry chopped glass fiber strands. The sized glass fiber strands have good choppability in that there is not a high amount of fly or fuzz produced during the chopping operation. The sized glass fiber strands in any form may be used for reinforcing thermosetting polymeric material.

36 Claims, No Drawings

AQUEOUS SIZING COMPOSITION AND GLASS FIBERS MADE THEREWITH FOR REINFORCING THERMOSETTING POLYMERS

BACKGROUND OF THE INVENTION

The present invention relates to an aqueous sizing composition for glass fibers and the sized glass fiber strand useful in reinforcing thermosetting polymers and the reinforced thermosetting polymeric material, where the sized strand in chopped form has good strength and good flow properties and leads to reinforced thermosetting materials with good strength.

Reinforced thermosetting polymeric composites can be reinforced with several forms of glass fibers including roving, continuous strand, chopped fibers or strands, mat, woven fabrics and the like. The glass fibers used as reinforcement for thermosetting polymeric materials are formed by being drawn at a high speed from molten cones of glass from tips of small orifices in a platinum-containing device known as a bushing. In order to protect the glass fibers from interfilament abrasion during formation and further processing and to make them compatible with polymeric materials like the thermosetting resins, a sizing composition is applied to the glass fibers during their formation. The sized glass fibers are then gathered into strands, and chopped during the forming process, a process known as the wet chop process, or wound into a package of continuous strand or strands known as a forming package. The wet chopped glass fiber strands or forming packages are then dried. The dry continuous strand of the forming package can then be chopped or combined with other dry continuous strand to form a roving, which may be subsequently chopped. The chopping of the dry continuous strand, strands or roving is a process known as dry chopping.

The sized glass fiber strands in these various forms are useful in producing glass fiber reinforced thermosetting polymeric composites. These composites are produced from thermosetting molding compounds such as bulk molding compounds and sheet molding compounds. The bulk molding compound is a combination of resin, short glass fibers usually having a length from about ⅛ to ½ inch, fillers, pigment, catalyst, thickness and other additives processed in bulk form in a high shear mixer or extruded into logs or ropes. The bulk molding compound is also available as a premix, which usually contains less specialized additives. The bulk molding compound typically has a glass content of around 10 to 25 weight percent. The sheet molding compound is a combination of resin, filler, chopped strand reinforcement, release agent, and catalyst processed in sheet form. Chemical thickeners such as alkaline earth oxides and hydroxides are used in sheet molding compound to increase the viscosity of the tack-free state. For use in sheet molding compound, the glass fiber strand roving is usually chopped to lengths of about 0.5 to 1 inch. The glass content of sheet molding compound typically ranges from about 25 to about 45 weight percent.

The processes used for producing these molding compounds place many demands for specific properties of the sized glass fiber strand. For example, the bulk molding compound is prepared by blending the short length chopped glass fiber strands into a putty prepared from a polyester resin or other thermosetting resin, fillers and other additives. This mixture is then mixed in the high shear mixer or extruded in such a manner to adequately disperse the glass fiber strands in the resin mixture. The bulk molding compound is then available in the bulk form for compression or injection molding or for extruding into logs or ropes of preforms cut to weight for compression or transfer molding. The bulk molding compound is typically molded at pressures from 300 to 1500 psi (20 to 102 atmospheres) and temperatures from 225°–300° F. (107°–149° C.). Cycle times range from 0.5 to 5 minutes depending on catalyst, temperature and thickeners of the composite part. The mechanical properties of the bulk molding compound are considerably less than the mechanical properties of sheet molding compound and products of other molding processes. The reasons for this are threefold. First, there is a low glass content in the bulk molding compound, second, the glass fibers have a short fiber length and third, the glass fiber strands tend to break up during the torturous mixing in the high shear mixer such as a sigma blade-type mixer.

Because of the rigors of processing such molding compounds, the formation of acceptable glass fiber reinforced molding composites demands the use of a proper sizing composition on the glass fibers. These sizing compositions must perform the dual function of protecting the glass fibers from abrasion during formation and further processing, while making the glass fibers compatible with the polymeric materials they are to reinforce. In the case of bulk molding compounds, the sizing compositions must also retard the break up of the glass fiber strands during the high shear mixing, which is necessary to disperse the glass fiber strands in a mixture containing the thermosetting or thermosettable resin. Typically, the sizing compositions for glass fibers are aqueous compositions having lubricants, film formers, coupling agents, wetting agents, emulsifiers and the like.

It would be beneficial to have a sized glass fiber strand that when they are in a chopped form have good flowability. Such a characteristic would enable the chopped glass fiber strands to easily move relative to one another when the chopped glass fiber strands are added from a source to a molding compound. Such a characteristic for glass fibers used in producing bulk molding compound would enable the chopped glass fiber strand to become dispersed more easily throughout the thermosetting resin mixture, and, thereby, reduce the amount of severe shear the chopped glass fiber strands are subjected to in preparing bulk molding compounds.

In addition, the sizing composition influences the behavior of the sized strands in producing chopped glass fiber strands as chopped strands or chopped roving. The sizing composition affects the choppability of the glass fiber strand by making the strand well integrated so that the strand is not easily filamentized when chopped. Also, the strand integrity given to the strand by the sizing composition should be retained after chopping, since it may affect the flowability of the chopped fibers, a characteristic that impacts on the removal of air during molding. The size present on the sized glass fiber strand to be chopped should provide this integrity between the strands while concomitantly preventing excessive generation of fly and fuzz when the strand is chopped.

It is an object of the present invention to provide an aqueous sizing composition for glass fibers and to provide sized glass fiber strand produced therewith that has good choppability to yield chopped sized glass fiber strand that has good strength and flow properties for use in producing thermosetting molding compounds for injection, compression, extrusion and transfer molding so that the molded reinforced thermosetting composite has good physical properties.

SUMMARY OF THE INVENTION

The foregoing object and other advantages herein described or inherent from the following description are accomplished by producing sized glass fiber strands having the residue of an aqueous sizing composition as hereinafter described.

The aqueous sizing composition has aqueous dispersible, emulsifiable or solubilizable film formers including a vinyl acetate-organo silane copolymer and a 1,2-polyepoxide polymer, wherein the weight ratio of the amount of the poly(vinyl acetate) silane copolymer to the amount of polyepoxide polymer ranges from about 95 to 5 to about 5 to 95 weight percent in the aqueous sizing composition. The aqueous sizing composition also has one or more nonionic surfactants, and an aqueous dispersible, solubilizable or emulsifiable polyamide and/or fatty acid amide, and at least one silane coupling agent, which is an epoxy-containing organo silane coupling agent or an amino containing-organo silane coupling agent or a mixture thereof. The aqueous sizing composition also has a blend of an aqueous dispersible, solubilizable or emulsifiable polyethylene-containing polymer and a wax where the weight ratio of the polyethylene-containing polymer to wax is in the range of about 25:1 to about 1:25. When the polyethylene-containing polymer has limited branching such as polyethylenes with densities around 0.935 or greater, the amount of wax may be deleted or reduced. The aqueous sizing composition along with water also contains an organic hydrocarbon acid or polyacid to give a pH for the aqueous sizing composition in the range of about 4 to around 9.

The aqueous sizing composition can be applied to any conventional glass fiber by any conventional method such as a wet chop forming process or a continuous strand forming process. When the continuous strand is to be subsequently chopped, the continuous strand should be dried before chopping at a temperature and time sufficient to remove a substantial amount of the moisture and set the cure for the coating. In producing wet chop glass fiber strands, the chopped strands are dried at a faster time and higher temperature than for dry chopping to flash the moisture and set the cure of the coating.

The glass fiber strand in any form such as chopped, continuous, mat and the like can be used to reinforce thermosetting polymers and can be used in producing thermosetting molding compositions.

DETAILED DESCRIPTION OF THE INVENTION

In producing a glass fiber reinforced thermosetting polymeric composite, many of the properties of the composite are directly attributable to the properties of the glass fiber reinforcement. One such property is the impact strength of the composite, which is measured by a moving load striking the composite as a stationary object. The impact strength of the composite is a measure of how much energy is absorbed by the test specimen of the composite, when the amount of load (or work) is sufficient to break the composite. There are several tests to measure impact, and the current popular test is the Izod Impact Test. This test that rather than giving results for partial failure as usually happens in reinforced polymeric composites gives results, which indicate the energy absorbed at failure or breakage of the composite. The results are reported in foot/pounds per inch (Joules/cm.) of width of the produced notch. Higher values for the results show that the tested material will absorb more energy before the moving weight is able to break it.

In order to achieve glass reinforced thermosetting composites that have good impact strength, the glass fiber reinforcement must have certain properties and must not be damaged during processing. This is particularly true where the glass fiber reinforcement is combined with the thermosetting material in a bulk molding compound. In this use, the strands not only must survive a chopping operation with little or no damage, but must also survive high shear mixing with the polymeric material and other additives. The strands must have characteristics that protect them from filamentization during chopping and from break up during high shear mixing of the bulk molding compound. Such a glass fiber strand is provided by the present invention, where the glass fibers are treated with an aqueous sizing composition as aforementioned.

It is believed, but the compositions of the present invention are not limited by this belief, that the accomplishment of attaining high physical properties, especially high impact properties for a reinforced thermosetting polymeric material, is achieved with the use of the aqueous sizing composition of the present invention by a unique blend of properties from the components constituting the aqueous sizing composition. There are two film forming materials, one, a poly(vinylaceate) silane copolymer and, second, a polyepoxide resin, that provide a film for the glass fibers and/or strands to assist in holding the filaments together in a bundle of filaments commonly called a strand. In addition, the film forming polymers have specific organic moieties that assist in bonding the film formers to the organofunctional end of the silane coupling agent or the thermosetting polymer to be reinforced through hydrogen bonding or Van der Walls forces. The aqueous sizing composition also contains one or more particular silane coupling agents to provide bonding between the glass fibers through the organic functional group of the silane to the film former or the thermosetting matrix polymer. The aqueous sizing composition also has two film former modifiers, a polyethylene-containing polymer and a wax, to provide a slip/flow characteristic to the sized glass fiber strand to enable the strands to move relative to each other after they are chopped in processing and to enable the chopped glass fiber strands to be more easily dispersed in the thermosetting polymer matrix in the preparation of a molding compound. This slip/flow characteristic of the sized glass fiber strands can be measured by mechanical means such as physical flow testing, i.e., funnel flow, bulk density levels, rheological spiral flow characteristics and throughput rates during compounding. All of these tests are known to those skilled in the art.

The film forming polymers must be compatible with the polymeric matrix to be reinforced and must be synergistic with the other components of the aqueous sizing composition to give good choppability properties to the glass fiber strand and to ultimately yield a reinforced thermosetting polymeric material with improved impact properties. For these reasons, the aqueous dispersible, emulsifiable or solubilizable poly(vinyl acetate) silane copolymer is used along with the aqueous dispersible, emulsifiable or solubilizable polyepoxide polymer in a ratio of amounts of around 99 to 1 to around 1 to 99. Preferably, the amount of the poly(vinyl acetate) silane copolymer is always equal to or greater than the amount of polyepoxide polymer in the aqueous sizing composition.

The poly(vinyl acetate) silane copolymer can be any suitable vinyl acetate-organo silane copolymer and is preferably one having an insolubility in styrene and a silane level of from about 1 to about 7 weight percent. The preferred vinyl acetate-organo silane copolymer used in the present invention is one which is available from National Starch and Chemical Corporation, Bridgewater, New Jersey 08807 under the trade designation Resyn 1037 Copolymer Emulsion. This material is a copolymer of vinyl acetate and gamma-methacryloxypropyltrimethoxy silane and has about a 2% silane level. The copolymer is present in a form of an aqueous emulsion having a solid content of 55%, a pH of 4.7, an average particle size of around 1 micron, a viscosity measured according to RVF Brookfield No. 2 spindle at 20 RPM's at 72° F. (22° C.) at 1225 centipoise and a mechanical stability in a Hamilton Beach mixer at 15 minutes at 10,000 RPM that is good. The amount of the vinyl acetate-organo silane copolymer present in the aqueous sizing composition is present in an amount in the range from about 1 to about 12 weight percent of the aqueous sizing composition, when the total solids of the aqueous sizing composition is in the range of about 2 to about 15 weight percent. If the total solids of the aqueous sizing composition is greater than this range then the amount of the copolymer used in the aqueous composition can be greater. Preferably, the amount of the vinyl acetate-organo silane copolymer present in the aqueous sizing composition is in the range of about 3 to about 10 weight percent of the aqueous sizing composition. On a solids basis, the amount of the copolymer present in the aqueous sizing composition ranges from about 40 to about 90 weight percent of the total solids of the aqueous sizing composition, and the amount of the copolymer present is equal to or greater than the amount of the polyepoxide polymer that is present.

A suitable epoxy compound for use in the aqueous sizing of the present invention is one that contains more than one group, which has an oxygen atom attached to adjacent carbon atoms known as an oxirane ring and depicted by the formula

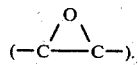

It is well known that epoxy resins may be prepared as a reaction product of a halohydrin and a phenol. One group of polyepoxy compounds, which may be used is obtained by the reaction of a stoichiometric excess of an epihalohydrin such as epichlorohydrin with a polyhydric phenol such as bis(4-hydroxy phenyl)-2,2-propane, bis (hydroxy phenyl) methane (obtained by the acid condensation of two moles of phenol with one mole of formaldehyde), hydroquinone, resorcinol, etc., or with a polyhydroxy alcohol such as glycol, polyethylene glycol, sorbitol, glycerol, etc. The epoxy resin has an epoxy equivalent weight of about 170 to about 900. By varying the proportions of the epihalohydrin and the polyhydric phenolic compound and/or by varying the reaction conditions, compounds of varying epoxide equivalents within this range can be produced which range from liquid to solid, but are preferably liquid. Typically, the molecular weight range can be between about 300 to about 900, and more preferably between about 300 and 600. The epoxy resin or resins can be used in an amount of about 0.1 to about 10 weight percent of the aqueous sizing composition and preferably about 0.2 to about 3.5 percent by weight based on the total weight of the aqueous sizing composition. A particularly suitable epoxy resin for use in the sizing composition of the present invention is designated "Epi-rez CMD 35201" commercially available from Celanese Polymer Specialties Co. This epoxy resin is an epoxy resin dispersion which has 59% nonvolatiles with the only volatile being water and a weight per epoxide of approximately 530, a pH of 8.3 and an average particle size between 1 and 4 microns. This epoxy resin may be cured using any conventional epoxy curing agents with allowance being made for the water environment. Another suitable epoxy resin that can be used is designated "Genepoxy 370 H55" which is commercially available from General Mills Chemical Division. The amount of the epoxy resin used in the aqueous sizing composition ranges from about 0.1 to 10 weight percent of the aqueous sizing composition and preferably about 0.5 to about 7 weight percent. On a solids basis of the aqueous size the polyepoxide resin is present in an amount of about 1 to about 60 weight percent and preferably about 5 to about 50 weight percent of the total solids of the aqueous sizing composition.

The aqueous dispersible, emulsifiable or solubilizable polyethylene-containing polymer useful in the aqueous sizing composition of the present invention is a polymer that contains predominantly polyethylene, but which may also contain a minor portion of 1-olefins or propylene or degradation derivatives thereof. The aqueous solubilizable, emulsifiable or dispersible polyethylene employed in the aqueous sizing composition can be a low density, medium density, or ultra-high molecular weight polyethylene, or thermal or oxidative degradation derivatives thereof. The polyethylenes can be produced by any conventional processes, for example, the high pressure polymerization process, Ziegler process, Phillips process, Standard Oil Process and the like. The thermal oxidation can be conducted by any method known to those skilled in the art and the oxidative degradation can be performed with any oxygen-containing gas like oxygen and/or ozone.

The low density polyethylene generally has highly branched and highly spaced chains, whereas the high density polyethylene and ultra-high molecular weight polyethylene are substantially linear and have closely aligned-chains. The branched chain, low density type polyethylene has a specific gravity of around 0.915, crystallinity of 50–60% and it is derived from ethylene which is polymerized in a free radical-initiated liquid phase reaction at elevated pressure and temperature with the use of catalysts. The medium density material is a blend of low and high density material and has a specific gravity of around 0.940 to around 0.955. The high density polyethylene has a specific gravity of around 0.95, crystallinity of 90% and is polymerized from ethylene by the use of Ziegler or supported metal oxide catalysts at from one to 100 atmosphere, at from room temperature to 200° F. (93° C.).

Also, the polyethylene may be present as a copolymer where the ethylene is copolymerized with varying percentages of 1-olefins or other materials, for example, 1-pentene, 1-butene and the like and 2-butene or acrylic acid and propylene from which a crystalline product results. When the polyethylene is a copolymer of polyethylene and polypropylene with a majority of the copolymer being polyethylene, the polypropylene that is employed has an average molecular weight in the range of about 5,300 to 7,300 and a ring and ball softening point of 150° to 175° C., a density of 0.85 to 1 gram per cubic centimeter and a penetration hardness (100 grams/5 seconds/72° F.) in tenths of a millimeter of 0.01 maximum.

The average molecular weight of the polyethylene is in the range of about 2,000 to greater than 1.5 million. When the higher molecular weight polyethylene cannot be suitably dispersed, emulsified or solubilized in water by standard techniques, the polyethylene can be degraded by heat or oxidation to reduce the molecular weight. Such standard techniques include emulsifying the polyethylene or polyethylene copolymer by melting the polyethylene or polyethylene copolymer and adding suitable emulsifying agents. This mixture is stirred and then water is added until the water-in-oil emulsion inverts to an oil-in-water emulsion. The emulsion contains about 15 to about 40% by weight of solids (non-aqueous ingredients) based upon the weight of the emulsion. Suitable emulsifying agents include Triton X100 surfactants, Igepal C0630 surfactant and Tergitol surfactants and various anionic emulsifying agents. A polyethylene emulsion which is suitable for use in the practice of the present invention is commercially available under the trade designation "Protolube HD" from Proctor Chemical Co., Inc. This material is a nonionic polyethylene emulsion having a solids content of approximately 26%, a pH (1% solution) of approximately 8 and with approximately 75% water which has an appearance of a milky emulsion and an odor of mild wax.

When the polyethylene is degraded to reduce the molecular weight in order to obtain an aqueous dispersible, emulsifiable or solubilizable polyethylene, it is preferred that the degradation occur by a methd that reduces the formation of branching and of double bonds in the degraded product. Such a method involves thermally degrading the polyethylene and then oxidatively degrading the thermally degraded polyethylene with a mixture of oxygen and ozone in the presence of low molecular weight polyethylene as shown in U.S. Pat. No. 3,692,877.

The amount of the aqueous dispersible, emulsifiable or solubilizable polyethylene-containing polymer used in the aqueous sizing composition ranges from about 0 to about 7 weight percent of the aqueous sizing composition and preferably about 0.1 to about 3 weight percent of the aqueous sizing composition. The amount of the polyethylene-containing polymer on a solids basis in the sizing composition is from around 0 to 25 weight percent of the solids of the sizing composition.

In addition, the aqueous sizing composition of the present invention has an aqueous soluble, emulsifiable or dispersible wax. The wax may be any suitable wax selected from the group consisting of vegetable waxes, such as carnauba, Japan, bayberry, candelilla, and the like; animal waxes such as beeswax, Chinese wax, hydrogenated sperm oil wax and the like; mineral waxes such as ozocerite, montan, ceresin and the like; and synthetic waxes such as polyalkylenes like polyethylenes, polyethylene glycols, polyethylene esters, chloronaphthalenes, sorbitals, polychlorotrifluoroethylenes; petroleum waxes such as paraffin, microcrystalline waxes and the like. The waxes are preferably those having a high degree of crystallinity and obtained from a paraffinic source, and most preferably are microcrystalline waxes. The microcrystalline waxes usually are branched chain paraffins having a crystal structure much smaller than that of normal wax and also a much higher viscosity and they are obtained by dewaxing tank bottoms, refinery residues and other petroleum waste products. Of these waxes, the most preferred is that having a melting point of about 50° C. or more. The waxes are typically used in the sizing formulation of the instant invention as aqueous dispersions containing 20 to 60 percent by weight wax. In the aqueous sizing formulation of the present invention the wax component is present in an amount of about 0 to about 6 and preferably 0.1 to 2 weight percent of the aqueous sizing composition. On a solids basis of the sizing composition, the aqueous dispersible wax is present in an amount of about 0 to about 10 and preferably about 0.1 to about 4 weight percent. An example of a suitable wax material is that available from Boler Petroleum Co. under the trade designation "518 Emulsion". This material is a thixotropic anionic microcrystalline wax emulsion with a melting point of around 87° C. to 92° C. and a percent solids of around 30±0.5 by azotropic distillation and a viscosity at 21° C. of 45±25 centipoise measured according to LVF Brookfield, No. 2 spindle at 60 RPM for 2 minutes, and with a pH at 21° C. of 8.5. Another example is the wax dispersion designated 84630 available from Michelman Chemical Co.

One or the other of the polyethylene or wax materials can be absent from the aqueous sizing composition, when the other is present in a certain amount. The amount for the polyethylene-containing polymer is from about 0.1 to about 7 weight percent of the aqueous sizing composition. On a solids basis, this amount is from about 1 to about 25 weight percent. The amount of the wax is from about 0.1 to about 6 weight percent of the aqueous size and on a solids basis about from 0.1 to about 10 weight percent. When the polyethylene-containing polymer is absent it is preferred that the wax is a microcrystalline paraffinic wax with a melting point of above 70° C. For the wax to be absent or reduced in an amount in the aqueous sizing composition, it is preferred that the polyethylene-containing polymer has a limited amount of branching such as, polyethylene with a density greater than around 0.935. With the use of this polyethylene polymer the amount of wax can range from 0 to about 2 weight percent of the aqueous sizing composition and from 0 to about 4 weight percent of the solids of the aqueous sizing composition. The polyethylene with limited branching is an aqueous dispersible, emulsifiable or solubilizable medium density, high density or ultra-high molecular weight polyethylene or degradation derivatives thereof prepared by thermal and/or oxidative degradation in such a manner as to limit the formation of branching and of double bonds in the polymer chains. By polyethylene with limited branching, it is meant that the polydispersity index ($M\overline{w}/M\overline{n}$) is less than 10 and preferably less than 3. The polyethylene with limited branching may also contain small amounts of methyl groups on and/or carbon double bonds in the polymer chains.

The aforementioned components of the aqueous sizing composition including the vinylacetate-organo silane copolymer and epoxy, function as the film formers in the sizing composition, while the polyethylene-containing polymer and wax function as the film former modifiers in the sizing composition. The film formers function as particular film formers in that the vinylacetate-silane copolymer film former provides compatability with the matrix resin in addition to providing film forming characteristics for the strand. The polyepoxide polymer with the intermediate molecular weight range, small average particle size, good shear stability can also be crosslinked with epoxy hardener to make the film less soluble in an organic environment as demonstrated by acetone entration. This polyepoxide also functions as a film forming polymer for the strand, but, in addition, provides compatability with the thermosetting matrix to be reinforced. In addition, these film forming polymer materials also provide functional groups which can provide, by hydrogen bonding or by Van der Wall's forces, chemical bonding with the thermosetting matrix and the glass fiber strand or silane compounds bonded to the glass fiber strands. The polyethylene-containing polymer in conjunction with the wax modify the film forming characteristic, but in addition, these materials serve as processing aids which contribute to higher impact strengths for the reinforced thermosetting material. This processing assistance gives the sized glass fiber strands a slip/flow characteristic. To obtain this characteristic the weight ratio of the polyethylene-containing polymer to the wax must be in the range of about 25:1 to about 1:25 and preferably about 1:10 to about 10:1 and more preferably around 1:1 to 10:1. Ratios of amounts outside this range of 25:1 to 1:25 do not provide any additional benefits for the increased cost of the increased addition of one or the other material. A slightly lesser degree of slip flow characteristic can be provided by just the presence of a polyethylene polymer with limited branching. The slip flow characteristic is measured by a funnel flow test. This test is conducted by placing a predetermined weight of chopped glass fiber strand in a funnel equipped for vibration. The time it takes for the predetermined weight to pass through the vibrating funnel is the funnel flow time. This time can range from several seconds for good slip flow characteristics to several minutes for poorer slip flow characteristics.

The aqueous sizing composition also has one or more silane coupling agents, where at least one silane coupling agent is an amino silane coupling agent. The amino silane coupling agent can be selected from the group of monoamino and diamino silanes. In addition to the amine silane coupling agent, there may be present a lubricant modified amino silane coupling agent where the lubricant is a standard textile lubricant known to those skilled in the art. Both of these silane coupling agents, when they are monoamino silane coupling agents would have amino functionality which can be designated by the general formula $$NH_2R-Si-(OR^1)_3$$

wherein: R is an alkylene radical having from 2 to 8 carbon atoms and $R^1$ is a lower alkyl radical or hydrogen; the lower alkyl radical having 1 to 5 carbon atoms, preferably having 1 or 2 carbon atoms.

Nonexclusive examples of amino silanes include gamma-aminopropyltriethoxysilane, N-(trimethoxy silylpropyl)ethane diamine acrylamide, aminomethyltriethoxysilane, aminopropyltrimethoxysilane, diaminopropyldiethoxysilane, triaminopropylethoxysilane, other similar mono and diamino silanes. In addition to the amino silane, there may be present an epoxy-containing silane coupling agent having a formula such as

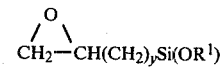

Where $R^1$ is as described above and y is an integer from 1 to 6. Representative examples of the epoxy silanes include beta-hydroxyethyltriethoxysilane; gamma-hydroxybutyltrimethoxysilane; 2,3-epoxypropyltrimethoxysilane; 3,4-epoxybutyltriethoxysilane; bis-(2,3-epoxypropyl)dimethoxysilane; glycidoxypropyltrimethoxysilane; and, 3,4-epoxycyclohexyltriethoxysilane. A number of other silanes containing at least one organic group substituted by one or more amino groups or epoxy groups may also be used in the practice of the present invention, and these silanes are well known to those skilled in the art.

As will be appreciated by those skilled in the art, the aforementioned silane coupling agents can be used as the silane coupling agent or its partial or full hydrolysis product (silanol) or its polymerization product (polysiloxane). The amount of the silane coupling agent present in the aqueous sizing composition is in the range of about 0.1 to about 2 weight percent of the aqueous sizing composition.

A mixture of the silane coupling agents may be used where the mixture contains the amino silane in a predominant amount of the 0.1 to 2 weight percent of the aqueous sizing composition and a minor amount of the lubricant modified amino silane coupling agent. The preferred mixture of the silane coupling agents used in the aqueous sizing composition of the present invention utilizes the lubricant-modified amino silane in the predominant amount, and the epoxy silane in a minor amount of the 0.1 to 2 weight percent of the aqueous sizing composition. In an alternative embodiment, the epoxy silane can be used along or in combination with an acrylate containing silane coupling agent like gamma-methacryloxypropyltrimethoxysilane and the like.

The aqueous sizing composition also has present, in addition to the aforementioned components, a glass fiber lubricant which is any cationic or nonionic lubricant known to those skilled in the art to be used in aqueous sizing compositions. The cationic lubricant can be an amine salt of a fatty acid that has 4 to 26 carbon atoms and an even number of carbon atoms per molecule. The fatty acid moiety of the salt can have preferably between about 12 and 22 carbon atoms. The amines useful for forming the salt are tertiary amines of substantially low molecular weight, i.e., the alkyl groups attached to the nitrogen atom should have between 1 and 6 carbon atoms. This cationic lubricant aids in the processing of the glass fiber strand by imparting some slip to the exterior of the strand as it passes over various types of processing equipment. Also, a solubilized fatty acid amide including both saturated and unsaturated fatty acid amides, where the acid group contains from 4 to 24 carbon atoms can be employed. Also utilized are the anhydrous acid solubilized polymers of lower molecular weight unsaturated fatty acid amides. A particularly effective material suitable for use in the present invention as a lubricant is the pelargonic acid amide of tetraethylene pentamine sold by Imperial Chemical Industries under the trade designation Cirrasol 185-A, which is a viscous liquid having a pH at 25° C. for a 2 percent solution of 8.5 to 9.5 and a total acidity of 12 to 14 percent.

The amount of the lubricant used in the aqueous sizing composition varies depending upon whether a lubricant modified amino silane coupling agent is used or the amino silane coupling agent is used. If the lubricant modified amino silica coupling agent is used, then the amount of lubricant in the aqueous sizing composition can be less than that used when the amino silane coupling agent is used. The amount of lubricant used when the lubricant modified amino silane coupling agent is used in the aqueous sizing composition is in the range of about 0.05 to about 5 weight percent of the aqueous sizing composition and preferably about 0.1 to about 1 weight percent of the aqueous sizing composition. If the amino silane coupling agent is used in the aqueous sizing composition the amount of lubricant used will have to be increased by about 10 percent over these ranges.

In addition, the aqueous sizing composition has present one or more nonionic surfactants. Any suitable nonionic surfactant known to those skilled in the art can be used in the aqueous sizing composition of the present invention, where the nonionic surfactant has the proper hydrophilic/lipophilic balance (HLB) and is present in the proper amount to provide a stable emulsion for the aqueous sizing composition. Preferably, the nonionic surfactant has an HLB in the range of about 10 to about 20. A suitable nonionic surfactant useful in the present invention is an alkyl aryl polyether nonionic surfactant. The preferred polyether nonionic surfactant is that commercially available under the trade designation Triton CF-10 surfactant which has an HLB of 14 and is available from the Rohm & Haas Company. The amount of the nonionic surfactant used in the aqueous sizing composition of the present invention is generally that necessary to provide a stable aqueous size and is preferably in the range of about 0.05 to about 3 weight percent of the aqueous sizing composition and about 0.1 to 5 weight percent of the solids of the aqueous sizing composition.

In addition to the aforementioned components of the aqueous sizing composition, there is also present an organic hydrocarbon acid, which is present for pH adjustment. Nonexclusive examples of such organic hydrocarbon acids or their anhydrides, where applicable, useful in the present aqueous sizing composition are acetic, formic, propionic acid, butyric, valeric, caproic, coprylic, lauric, myristic, palmitric, stearic, oleic, lactic, monochloroacetic, chlorabenzoic, benzoic, pyruvic and polycarboxylic acid, and their anhydrides both saturated and unsaturated such as maleic, fumaric, itaconic, citraconic, acrylic, methacrylic, crotonic, icocrotonic, mesaconic, angelic and mixtures of these. The amount of the organic hydrocarbon acid useful in the present invention is that amount which gives a pH for the aqueous sizing composition in the range of about 4 to around 9. The preferred organic hydrocarbon acid or anhydride is acetic acid which gives a preferred pH for the aqueous sizing composition of around 4 to around 7.

As can be appreciated by those skilled in the art, additional ingredients can be included in the aqueous sizing composition such as additional film formers, lubricants, wetting agents, silane coupling agents, surface energy modifiers, such as surfactants for facilitating sizing stability, coatability, uniformity, and wettability, and process aids to promote mechanical handling properties during the fabrication and use of the resultant sized chopped glass fiber strand product. All the additives are those used by those skilled in the art. These additional components may be added, but are not necessary to achieve the sized glass fiber strands having integrity on chopping and slip/flow properties between strands and in polymeric molding compounds, and to achieve the reinforced thermosetting polymeric materials with improved impact properties.

The total solids (non-aqueous) content of the sizing composition is about 1 to about 30% by weight of the size and preferably about 5 to about 15% by weight of the size. In all events, the amounts of the solid components of the aqueous sizing composition should not exceed that amount which will cause the viscosity of the solution to be greater than about 100 centipoise at 20° C. Solutions having a viscosity of greater than 100 centipoise at 20° C. are very difficult to apply to glass fiber strands during their formation without breaking the strand. It is preferred that the viscosity of the size be between 1 and 20 centipoise at 20° C. for best results.

The aqueous sizing composition is applied to the fibers to obtain a solids application of about 0.1 to about 3% by weight based on the total weight of the fibers with the sizing composition and more preferably between about 0.05 and 2% by weight. The aqueous sizing composition is applied to the glass fibers during the conventional forming process to produce sized continuous glass fiber strands or wet chopped glass fiber strands. In producing continuous glass fiber strands, the sizing composition is applied to the fibers prior to the time they are gathered together to form one or more strands by means of any applicator known in the art to contact a liquid with a solid object such as, a roller applicator which is partially submerged in the sizing composition contained in a reservoir such as the applicator shown in U.S. Pat. No. 2,728,972, which is hereby incorporated by reference, or a spray applicator. The fibers are gathered into strands by a gathering shoe and wound onto a forming package rotating at a sufficient speed to attenuate the fibers from the orifices in the bushing of a glass fiber batch melting furnace. Other methods of applying the sizing composition to the strands of glass fibers such as pad applicators may be employed.

A strand may be formed by means other than winding on the forming tube, such as by means of a pair of rotating wheel pullers, which direct fibers into a suitable collecting device. An example of such a process is the production of wet chopped glass fiber strands. In this process the glass fibers are drawn from cones of molten glass by attenuation and sized with the aqueous sizing composition. The attenuation is provided by a pair of rotating circumferentially juxaposed wheels. As the glass fibers are attenuated by these two wheels, they are also cut or chopped as is more fully explained in U.S. Pat. No. 3,869,268, hereby incorporated by reference. As can be appreciated by those skilled in the art, any conventional method for producing wet chopped glass fiber strands or dry chopped glass fiber strands during the forming process for producing glass fibers can utilize the aqueous sizing composition of the present invention. When the glass fiber strands are formed by a wet chopped glass fiber forming process, and dried in a drier with a short residence time and high temperature of around 150° C. or higher, it is preferred that the aqueous sizing composition used to treat the glass fiber strands contain the mixture of amino silane modified with a lubricant and epoxy silane coupling agents in order to achieve good impact properties for the subsequently reinforced thermosetting polymer even with the rapid drying of the glass fiber strands in this process.

When the glass fiber strands are processed into continuous glass fiber strands, they are dried in conventional drying ovens at temperatures around 110° C. to 150° C. preferably 115°–130° C. for around 11 hours or any time and temperature relationship that gives equivalent drying to remove a substantial amount of the moisture of the strands. After this drying step, the continuous glass fiber strands can be chopped or processed into roving for reinforcement of thermosetting polymers. It is preferred to use the sized glass fiber strands of the present invention as dry chopped glass fiber strands, where the dried continuous glass fiber strand is chopped by any method known to those skilled in the art into varying lengths, preferably around ⅛ of an inch to less than 1 inch, although longer lengths can also be used.

The glass fiber strands that are treated with the aqueous sizing composition of the present invention can be any glass fiber strands known to those skilled in the art that are capable of reinforcing thermosetting polymeric materials. The preferred glass fiber strand is that known as E-glass or 621 glass or any more environmentally acceptable derivatives thereof. Any boro-alumina-silicate glass that can be fiberized can be used for treatment with the aqueous sizing composition of the present invention and the treated glass fiber strands can be used in any form for reinforcing thermosetting polymeric materials.

The thermosetting polymeric materials that can be reinforced with the sized glass fiber strands of the present invention include such thermosetting polymers as unsaturated polyesters and vinylesters, epoxies, phenolic resins, alkyd resins, silicone resins and diallyl phthalate homopolymers and polyamide, urea and melamine containing resins and polyurethanes. It is preferred that the sized glass fiber strands of the present invention be used in reinforcing the unsaturated polyester thermosetting resins. It is most preferred to reinforce the unsaturated polyester resin in form of bulk molding compound.

The bulk molding compound is formed from a thickenable polyester resin having a polymerizable monomer therein. Typically, the polyester resin is thickened with magnesium oxide or magnesium hydroxide. The relatively low viscosity is encountered on the initial mixing of the magnesium oxide with the unsaturated polyester-monomer solution. After aging the solution, it substantially thickens to form a compound having a viscosity much like dough (i.e., 10 to 70 million centipoise). This molding compound may also contain fillers such as clay, talc, calcium, carbonate, silica, calcium silicate and the like. Additionally, pigments may be added to impart color to the molding compound. The unsaturated polyester resinous material can be any resinous material typically used for bulk molding compound. The ethylenically unsaturated monomer that is copolyermizable with the unsaturated polyester resin can be any typical ethylenically unsaturated monomer used in molding compounds. Also, any catalysts as typically used in molding compound to free radically polymerize and thereby crosslink the polyester resin can be used. Also any additives that retard shrinkage of the curing resin can be used.

The bulk molding compound is prepared with the glass fiber by mixing in a high shear mixer such as a sigma mixer the unaged polyester monomer solution having the thickening agent and other ingredients therein along with the chopped sized glass fiber strand or roving of the present invention. This high shear mixer homogeneously disperses the glass fibers throughout the resinous phase of the composition thus forming a bulk molding compound which, after thickening on aging, can be sliced into desired shapes such as cubes and the like and placed in a press to form the articles of the desired design. Also, the molding compound can be used in injection molding, extrusion molding and transfer molding to form objects of these desired design.

PREFERRED EMBODIMENT

The aqueous sizing composition of the preferred embodiment has the following formulation based on the solids of the sizing composition:

| | |
|---|---|
| Gamma-glycidoxypropyltrimethoxysilone | About 1 to 6 weight percent |
| Acetic acid | About .05 to 0.5 weight percent |
| Polyepoxide polymer with a molecular weight between 300 and 600, most preferably with a weight per epoxide of around 530 and a particle size between 1 and 4 microns | Between 8 to 35 weight percent |
| Poly(vinyl acetate) silane copolymer | Between 45 to 75 weight percent |
| Anhydrous acid solubilizable fatty acid amide lubricant dispersible or solubilizable in water | 2 to 3 weight percent |
| Alkyl aryl polyether nonionic surfactant with an HLB of around 14 | 1 to 2 weight percent |
| Lubricant modified gamma-aminopropyl-triethoxysilane | .01 to 0.2 weight percent |
| High density polyethylene polymer dispersible solubilizable or emulsifiable in water | 5 to 11 weight percent |
| Microcrystalline wax with a melting point greater than 70° C. | 2.5 to 4.0 weight percent |

Although the aqueous sizing composition can be prepared by any conventional method, it is preferred to prepare the aqueous sizing composition in the following manner. In the preparation, the water is preferably deionized water and all stirring is preferably at a moderate speed with low foaming. Water at a temperature of around 55° F. to 85° F. (12°–30° C.) in an amount lof around 20 to 40 percent of the final volume of the aqueous sizing composition is added to a main mix tank. The water is acidified with acetic acid at a slow rate and the gamma-glycidoxypropyltrimethoxysilane is added to this mixture at a somewhat faster rate than the addition of the acetic acid. The silane is hydrolyzed for about 15 to 45 minutes at a moderate speed. In one premix tank, water at a temperature of 140° to 160° F. (60°–71° C.) in an amount of about 1 to about 10 percent of the final volume of the aqueous sizing composition is added. The amount of the anhydrous acid solubilizable fatty acid amide lubricant is added at a moderate rate and dissolved. When dissolved, the mixture in the premix tank is acidified with acetic acid and cooled to 100° F. (38° C.) or lower by adding about 1 to about 5 percent of the final volume of the aqueous sizing composition of warm water (55°-85° F. [20°-30° C.]) at a slow rate. The mixture from this premix tank is added to the main mix tank at a moderate rate. In a premix tank, warm water in the amount of around 10 percent of the final volume of the aqueous sizing composition is added. The poly(vinyl acetate) silane copolymer is added with the temperature in the range of around 60°-100° F. (15°-38° C.) at a fast rate with stirring. This mixture is then added to the main mix tank.

In a premix tank, warm water in an amount of around 5 to 10 percent of the final volume of the aqueous sizing composition is added and the polyepoxide polymer is added at a temperature of around 60° to 100° F. (15°-30° C.) at a fast rate. The mixture is stirred for 2 minutes and added to the main mix tank. To a premix tank, hot water is added at a temperature of about 140° to 160° F. (60°-71° C.) in an amount of around 1 to 3 percent of the final volume of the aqueous sizing composition. The alkyl aryl polyether nonionic surfactant is added at a moderate rate, stirred for 1 to several minutes and cooled to around 100° F. (38° C.) or lower with warm water and added to the main mix tank. In a premix tank, warm water is added in an amount of around 1 to 3 percent of the final volume of the aqueous sizing composition. Added to this water is the microcrystalline wax at a temperature of around 60° to 100° F. (15°-30° C.) at a fast rate. The mixture is stirred for 1 to several minutes and added to the main mix tank. In a premix tank, there is added warm water in an amount of around 0.1 to 1 percent of the final volume of the aqueous sizing composition and lubricant modified gamma-aminopropyltriethoxysilane is added at a moderate rate. The silane is hydrolyzed for several minutes and added to the main mix tank at a moderate rate. In a premix tank, ambient water is added where the water is in an amount of around 1 to 5 percent of the final volume of the aqueous sizing composition. To this water there is added the high density polyethylene aqueous emulsion available as Protolube HD at a warm temperature and a fast rate. This mixture is stirred for several minutes and added to the main mix tank.

The remaining water is added to the main mix tank as warm water at a fast rate to make up the desired volume. The final temperature of the aqueous sizing composition is around 60° to 80° F. (15°-27° C.) and the pH is around 5 to 5.5. and the solids is around 11 to 12 weight percent, while the specific gravity is around 1.014 and 1.018 and the viscosity in centipoise measured by UL adapter at 30 RPM is around 1.90 to about 2.20.

This aqueous sizing composition is preferably used to treat glass fibers having a fiber diameter ranging from around 5 to around 16 microns and preferably around 8 to 15 microns. The glass fibers can be combined in any number to form strands, and the strands can be chopped during the forming process known as the wet chop process, but, preferably, the strands are wound into a continuous package known as a forming package. The forming packages are then dried preferably at a temperature of at least 240° F. (115° C.) for around 11 hours, although any equivalent heating to remove a substantial amount of the moisture accomplished by different temperatures and time can also be used. The dried glass fiber strands can be chopped or combined into a roving for chopping, where the chopping process is conducted by any conventional chopping method. Such a conventional chopping method would utilize conventional choppers for dry chopped glass fiber strands. The dry chopped glass fiber strands are preferably chopped into lengths of ⅛ to ½ inch, although longer lengths and possibly somewhat shorter lengths can also be obtained. The dry chopped glass fiber strand having an average length of ⅛ to ½ inch is used preferably with bulk molding compound.

In preparing the bulk molding compound, the dry chopped glass fiber strands have better slip/flow characteristic in relationship of one chopped glass fiber strand to another. This allows for better processability while placing the dry chopped glass fiber strands into a high shear mixer to be admixed with the thermosetting molding compound and other ingredients. The dry chopped glass fiber strands exhibit better dispersibility in the polymeric mixture used to produce the bulk molding compound, since the chopped glass fiber strands have a higher degree of slip/flow characteristic relative to the strands and the thermosetting bulk molding compound.

The following examples are illustrative of several formulations of the aqueous sizing composition of the present invention. Example I is a further description of the best mode for carrying out the invention and the other example illustrate alternative embodiments.

EXAMPLES

Five aqueous sizing compositions were prepared in a manner similar to that described for the preferred embodiment and the formulations of these five sizing compositions are presented in Table I.

TABLE I

| AQUEOUS SIZING COMPOSITIONS IN WEIGHT PERCENT SOLIDS AND WEIGHT PERCENT OF AQUEOUS COMPOSITION | | | | | |
|---|---|---|---|---|---|
| | Example 1 | Example 2 | Example 3 | Example 4 | Example 5 |
| Gamma-glycidoxypropyl-trimethoxysilane Solids 80.9 Weight Percent | 3.4/0.4 | 4.4/0.5 | 4.2/0.5 | 4.5/0.5 | 2.1/0.25 |
| Acetic Acid | 0.8 grams | .18/0.02 | 8 grams | 8 grams | 8 grams |
| Pelargonic Acid Amide of tetraethylene pentamine (Cirrosol C-185A) Solids 100 Weight Percent | 2.8/0.32 | 2.57/0.35 | 2.4/0.3 | 2.58/0.3 | 2.4/0.3 |
| Acetic Acid | 3.0 grams | 30 grams | 30 grams | 30 grams | 30 grams |
| Poly(vinylacetate)silane copolymer emulsion (NS-25-1037) 55 Weight Percent Solids | 45.9/5.4 | 73.4/8.8 | 69.5/8.32 | 48.7/5.8 | 45.9/5.5 |

TABLE I-continued

AQUEOUS SIZING COMPOSITIONS IN WEIGHT PERCENT SOLIDS AND WEIGHT PERCENT OF AQUEOUS COMPOSITION

| | Example 1 | Example 2 | Example 3 | Example 4 | Example 5 |
|---|---|---|---|---|---|
| Epoxy polymer emulsion 59 Weight Percent Solids | 32.8/3.9 | 8.4/1.0 | 8.0/0.95 | 33.7/4.0 | 31.8/3.8 |
| Alkylarylpolyether Nonionic Surfactant HLB-14 (Triton CF-10) | 1.4/0.16 | 1.5/0.17 | 1.4/0.17 | 1.5/0.17 | 1.4/0.17 |
| Lubricant modified gamma-aminopropyltriethoxysilane (A-1108) 90 Weight Percent Solids | 0.1/0.01 | 0.11/0.01 | 0.02/0.01 | 0.11/0.01 | 0.1/0.01 |
| Gamma-methacryloxypropyl-trimethoxysilane (A-174) | — | — | — | — | 2.1/0.25 |
| Polyethylene polymeric emulsion (Protolube HD)(26.5 wt. % solids) | 10.4/1.2 | 5.4/0.65 | 10.3/1.2 | 5.4/0.64 | 10.2/1.2 |
| Microcrystalline wax (518 Emulsion) | 3.13/0.36 | 3.3/0.4 | 3.2/0.38 | 3.3/0.4 | 3.1/0.37 |

Physical properties for the aqueous sizing composition are reported in Table II along with physical properties of the sized glass fiber strands. The sized glass fiber strands were produced as K-37 sized glass fiber strands that were produced by the aforementioned process for producing continuous glass fiber strands which were then dried at a temperature of 270° F. (132° C.) for around 11 hours and subsequently dry chopped by a conventional process known to those skilled in the art.

molding compounds were then molded by compression molding with the same conventional molding machine. Physical data for these molded materials are presented in Table III.

TABLE III

PHYSICAL PROPERTIES OF COMPRESSION MOLDED BULK MOLDING COMPOUND

| Examples | Chopped Strand/Content | & LOI | MOLDED FLEX STR, PSI DRY | WET | MOLDED TENSILE STR, PSI DRY | WET | MOLDED IZOD IMPACT ft lbs/in (joules/meter) |
|---|---|---|---|---|---|---|---|
| Commercial Example | ¼"/— | — | 10600 | — | 4670 | — | 6.81 (363.5) |
| Example 1 | ¼"/(3075) | 1.9-2.3 | 11800 | — | 5940 | — | 6.88 (367.3) |
| Example 1 | ¼"/26% | 2.03 | 15800 | 18000 | 6090 | 5900 | 5.37 (286.6) |
| Example 2 | ¼"/26% | 2.13 | 15900 | 16400 | 6040 | 5530 | 5.60 (299) |
| Example 3 | ¼"/26% | 2.00 | 17400 | 15200 | 5590 | 4700 | 6.01 (320.8) |
| Example 4 | ¼"/26% | 2.03 | 14900 | 15200 | 5690 | 5830 | 4.39 (234.3) |
| *Injection Molding Physical Properties* | | | | | | | |
| Example 1 | ⅛"/— | 1.9-2.3 | 7000 | — | 3350 | — | 2.99 (160) |
| Commercial | ⅛"/— | — | 7700 | — | 3030 | — | 2.32 (123.8) |

As is evident from Tables II and III, the slip/flow characteristics of the sized glass fiber strands is improved as is indicated by the funnel flow test which ranges from 4 seconds to around 15 seconds, whereas average funnel flow values are usually greater than one minute and sometimes approaching several minutes.

TABLE II

PHYSICAL PROPERTIES OF AQUEOUS SIZE AND SIZED GLASS FIBER STRANDS

| | Aqueous Size Properties | | | Strand Properties | | | |
|---|---|---|---|---|---|---|---|
| Examples | Percent Solids | pH | % LOI | Formability of Strands | Choppability Fly/Fuzz | Funnel Flow in Seconds/1kg | Strands Bulk Density lb/ft³ (kg/m³) |
| Example 1 | 11.5-11.9 | 5-5.5 | 1.9-2.3 | Very good | L/L | 7 | 36 (576.7) |
| Example 2 | 12.1 | 6.6 | 1.9-2.3 | Very good | M/M | 10 | 31.8 (509.4) |
| Example 3 | 12.1 | 6.6 | 1.9-2.3 | Very good | M/M | 7 | 31.9 (511) |
| Example 4 | 12.1 | 6.9 | 1.9-2.3 | Very good | M/L | 11 | 34 (544.6) |
| Example 5 | 11.6-11.9 | 5-5.5 | 1.9-2.3 | Very good | L/L | 12 | 31.9 (511) |

L is low and M is moderate.

The sized glass fiber strands of Examples 1 through 4 were used to produce bulk molding compound with the same conventional polyester thermosetting polymeric mixture including thickness, catalyst, and monomer. Also, chopped glass fiber strand commercially available from Owens Corning Fiberglas Inc. under the trade designation, 405AB was used in producing bulk molding compound with the same polymeric mix. The bulk Also, the improved impact properties of thermoset molded articles reinforced with sized glass fiber strands of the present invention are evident from Table III, where it is shown that the impact strength for compression molding range from 4.39 ft-lb./in. to 6.88 ft-lb./in. whereas average impact properties for thermoset molded articles is slightly lower at around 4 to 6 ft-lb./in.

In Table II, the funnel flow test was conducted by placing a given quantity of the chopped glass fiber strands either dry chopped or dried wet chop in a funnel equipped for vibration. The time it took the total weight to pass through the funnel was recorded.

In Table II, the bulk density test measures slip flow characteristic in relation to compaction of chopped glass fiber strands. Compaction comes into play in molding reinforced thermosetting polymeric materials. Bulk density is measured by filling a test tube with known volume with chopped glass fiber strands. The test tube is placed on a shaker and the volume occupied by the strands after shaking is recorded. High volumes indicate better bulk density.

In Table III, tensile strength, flexural strength, and Izod impact tests were conducted according to test methods of the American Society of Testing and Materials (ASTM). These tests included respectively D-638, D-790, and D-256.

The foregoing has disclosed an aqueous sizing composition and sized glass fiber strands produced therewith which lead to improved slip/flow properties of chopped glass fiber strands and improved impact properties of thermoset molded articles reinforced with these sized glass fiber strands. These improvements are accomplished by the aqueous sizing composition comprising two film forming polymers which include a poly(vinyl acetate) silane copolymer and 1,2-epoxy polymer along with one or more silane coupling agents selected from amino silane coupling agents, lubricant modified amino silane coupling agents and epoxy-containing amino silane coupling agents or mixtures thereof and also having a fatty acid amide lubricant and one or more nonionic surfactants and a blend of a polyethylene-containing polymer and a wax and also having a hydrocarbon acid. The chopped glass fiber strands can be produced by wet chopping or dry chopping, wherein the dry chopped glass fiber strands are dried at a temperature and time to remove substantial amounts of moisture such as a temperature of 140° F. (115° C.) for a time of around 11 hours or any other time/temperature relationship which gives equivalent drying. The chopped glass fiber strands are then used in producing bulk molding compounds with thermosetting polymers and conventional bulk molding compound additives and ingredients, and the bulk molding compound can be molded by compression molding, extrusion molding, injection molding and transfer molding.

I claim:

1. An aqueous sizing composition for glass fibers to yield sized glass fiber strands useful in reinforcing thermosetting polymers, comprising:
   (a) poly(vinylacetate) silane copolymer,
   (b) epoxy polymer,
   (c) one or more glass fiber lubricants,
   (d) an organo silane coupling agent selected from the group consisting of amino-organo-silane coupling agents, lubricant modified amino-organo-silane coupling agents, epoxy-containing silane coupling agents and a mixture of two or more of these agents,
   (e) one or more nonionic surfactants,
   (f) polyethylene-containing polymer in an amount of 0 to about 25 weight percent of the solids of the aqueous sizing composition,
   (g) wax in an amount of about 0 to about 5 weight percent of the solids of the aqueous sizing composition where an amount of the polyethylene-containing polymer is present when the wax is absent and an amount of wax is present if the polyethylene-containing polymer is absent and when both are present, the weight ratio of the polyethylene-containing polymer to wax is in the range of about 25:1 to about 1:25,
   (h) organic hydrocarbon acid to give the composition a pH in the range of about 4 to about 9, and
   (i) water to give a total solids content in the range of about 1 to about 30 weight percent.

2. Aqueous sizing composition of claim 1, wherein the poly(vinylacetate) silane copolymer is a vinylacetate-organo-silane copolymer having an insolubility in styrene and a silane level of from about 1 to about 7 weight percent.

3. Aqueous sizing composition of claim 1 or 2, wherein the amount of the poly(vinylacetate) silane copolymer is in the range of about 1 to about 12 weight percent of the aqueous sizing composition.

4. Aqueous sizing composition of claim 1 or 2, wherein the amount of the poly(vinylacetate) silane copolymer is in the range of about 1 to about 12 weight percent of the aqueous sizing composition and the amount is always greater than the amount of the epoxy polymer.

5. Aqueous sizing composition of claim 1, wherein the epoxy polymer has a molecular weight in the range of about 170 to about 900.

6. Aqueous sizing composition of claim 1 or 5, wherein the amount of the epoxy polymer present is in the range of about 1 to about 60 weight percent of the solids of the aqueous sizing composition.

7. Aqueous sizing composition of claim 1 or 5, wherein the amount of the epoxy polymer is in the range of about 1 to about 50 weight percent of the solids of the aqueous sizing composition and the amount is always less than the amount of the poly(vinylacetate) silane copolymer.

8. Aqueous sizing composition of claim 1, wherein the polyethylene-containing polymer is selected from high density polyethylene, medium density polyethylene, low density polyethylene, ultra high molecular weight polyethylene, polyethylene-polypropylene copolymer and polyethylene-1-olefin copolymers wherein the polyethylene is present in the major amount.

9. Aqueous sizing composition of claim 1, wherein the wax has a melting point above about 50° C.

10. Aqueous sizing composition of claim 1, wherein the amino silane is gamma-aminopropyltriethoxysilane.

11. Aqueous sizing composition of claim 1, wherein the lubricant modified amino silane coupling agent is gamma-aminopropyltriethoxysilane.

12. Aqueous sizing composition of claim 1, wherein the epoxy-containing polymer is gamma-glycidylpropyltrimethoxysilane.

13. Aqueous sizing composition of claim 1, which includes about 0.1 to about 4 weight percent of the aqueous sizing composition of a vinyl-containing silane coupling agent.

14. Aqueous sizing composition of claim 13, wherein the vinyl-containing silane coupling agent is gamma-methylacryloxypropyltrimethoxysilane.

15. Aqueous sizing composition of claim 1, wherein the amount of the one or more silane coupling agents is in the range of about 0.1 to about 4 weight percent of the aqueous sizing composition.

16. Aqueous sizing composition of claim 1 wherein the organic hydrocarbon acid is acetic acid.

17. Aqueous sizing composition of claim 1, wherein the nonionic surfactant is an alkyl aryl polyether with an HLB of around 14.

18. Aqueous sizing composition of claim 1, wherein the wax is a microcrystalline wax with a melting point greater than 50° C.

19. Sized glass fiber strand containing the aqueous sizing composition of claim 1.

20. Dry chopped glass fiber strands having an LOI in the range of about 1.5 to 2.5 of the aqueous sizing composition of claim 1, wherein the dry chopped glass fiber strands were dried at a temperature and time that are sufficient to remove a substantial amount of the moisture from the sized strands.

21. Dry chopped glass fiber strands of claim 20 dried at a temperature of at least 240° F. (115° C.) at around 11 hours.

22. Thermosetting molding compound having the dry chopped glass fiber strands of claims 20 or 21 along with a thermosetting polymer, catalyst, thickener and monomer.

23. Molded article of the molding compound of claim 22.

24. Molding compound of claim 22 wherein the thermosetting polymer is selected from the group consisting of unsaturated polyester, unsaturated vinyl esters, epoxy polymers including 1,2-epoxy polymers, phenolic resins, alkyd resins, silicone resins and diallyl phthalate homopolymers, polyamides, urea and melamine containing resins and polyurethanes.

25. Aqueous sizing composition for glass fibers used in producing glass fiber strands for use in thermosetting molding compounds for production of reinforced thermoset articles, comprising:
(a) poly(vinylacetate) silane copolymer which is insoluble in styrene and has a silane level of from about 1 to about 7 weight percent of the copolymer which is present in the aqueous sizing composition in an amount of about 40 to about 90 weight percent of the total solids of the aqueous sizing composition,
(b) epoxy polymer having a molecular weight in the range of about 170 to about 900 present in an amount in the range of about 1 to about 60 weight percent of the solids of the aqueous sizing composition,
(c) one or more alkyl aryl polyether nonionic surfactants with an HLB of around 14,
(d) a mixture of organo silane coupling agents having a predominant amount of an epoxy-containing silane coupling agent and a minor amount of a lubricant modified amino-organo silane coupling agent,
(e) pelargonic acid amide of tetraethylene pentamine in an amount in the range of about 0.05 to about 5 weight percent of the aqueous sizing composition,
(f) high density polyethylene polymer present in an amount of about 2 to about 25 weight percent of the solids of the sizing composition,
(g) a microcrystalline paraffinic wax with a melting point greater than 50° C. present in an amount of about 1 to about 5 weight percent of the solids of the aqueous sizing composition, and where the weight ratio of the polyethylene polymer to the wax is in the range of about 10:1 to about 1:10,
(h) organic hydrocarbon acid to give the composition a pH in the range of about 4 to around 7, and
(i) water to give a total solids content in the range of about 1 to about 30 weight percent.

26. Aqueous sizing composition of claim 25, wherein the poly(vinylacetate) silane copolymer is a copolymer of vinylacetate and gamma-methacryloxypropyltrimethoxysilane and has about 2 percent silane.

27. Aqueous sizing composition of claim 25 or 26, wherein the amount of the poly(vinylacetate) silane copolymer is always greater than the amount of the epoxy polymer.

28. Aqueous sizing composition of claim 25, wherein the lubricant modified amino silane coupling agent is gamma-aminopropyltriethoxysilane.

29. Aqueous sizing composition of claim 25, wherein the epoxy-containing silane is gamma-glycidoxypropyltrimethoxysilane present in an amount in the range of about 0.1 to about 4 weight percent of the aqueous sizing composition.

30. Aqueous sizing composition of claim 25, wherein the ratio of the high density polyethylene polymer to microcrystalline wax is in the range of about 1:1 to about 10:1.

31. Aqueous sizing composition of claim 25, wherein the weight ratio of the vinylacetate-organo silane copolymer to the epoxy polymer is in the range of about 1:1 to about 1:1.

32. Sized glass fiber strands having a coating of the aqueous sizing composition of claim 25.

33. Sized glass fiber strands of claim 32, dry chopped with drying conditions of temperature at least about 240° F. (115° C.) for around 1 hours or any other time/temperature relationship giving equivalent drying.

34. Bulk molding compound having the dried chopped strands of claim 33.

35. An aqueous sizing composition for treating glass fibers useful in reinforcing thermoplastic polymers, comprising:
a. poly(vinyl acetate) silane copolymer,
b. epoxy polymer,
c. polyethylene-containing polymer with limited branching,
d. an organo silane coupling agent selected from the group consisting of amino-organo-silane coupling agents, lubricant modified amino-organic-silane coupling agents, epoxy-containing silane coupling agents and a mixture of two or more of these agents, and
e. water in an amount to give a total solids for the composition in the range of 1 to about 30 weight percent.

36. Glass fibers sized with the aqueous treating composition of claim 35.

* * * * *

UNITED STATES PATENT AND TRADEMARK OFFICE
CERTIFICATE OF CORRECTION

PATENT NO. : 4,394,418
DATED : July 19, 1983
INVENTOR(S) : Chester S. Temple

It is certified that error appears in the above—identified patent and that said Letters Patent is hereby corrected as shown below:

Column 22, line 37 "1:1 to about 1:1." should read

--1:1.--

Column 22, line 42, 1 hours should read

-- 11 hours --.

Signed and Sealed this

Twenty-fifth Day of October 1983

[SEAL]

Attest:

GERALD J. MOSSINGHOFF

Attesting Officer        Commissioner of Patents and Trademarks